United States Patent [19]

Hasbrouck et al.

[11] 3,718,912

[45] Feb. 27, 1973

[54] INSTRUCTION EXECUTION UNIT

[75] Inventors: Leo J. Hasbrouck; Bill C. Madden, both of Saratoga; Robert P. Rew, San Jose, all of Calif.; Edward H. Sussenguth, Cary, N.C.; John R. Wierzbicki, Saratoga, Calif.

[73] Assignee: International Business Machines Corporation, Armonk, N.Y.

[22] Filed: Dec. 22, 1970

[21] Appl. No.: 100,704

[52] U.S. Cl. ....................340/172.5
[51] Int. Cl. ....................G06f 9/19
[58] Field of Search ....................340/172.5

[56] References Cited

UNITED STATES PATENTS

| | | | |
|---|---|---|---|
| 3,462,744 | 8/1969 | Tomasculo et al. | 340/172.5 |
| 3,201,761 | 8/1965 | Schmitt et al. | 340/172.5 |
| 3,425,039 | 1/1969 | Bahrs et al. | 340/172.5 |
| 3,461,434 | 8/1969 | Barton et al. | 340/172.5 |
| 3,544,974 | 12/1970 | Tan | 340/172.5 |
| 3,614,741 | 11/1971 | McFarland et al. | 340/172.5 |

*Primary Examiner*—Paul J. Henon
*Assistant Examiner*—Sydney R. Chirlin
*Attorney*—Hanifin and Jancin and Owen L. Lamb

[57] ABSTRACT

An execution system for instructions having source and sink operand designations includes an arithmetic unit, execution means for holding an instruction for controlling the arithmetic unit and a plurality of operand registers, each having tag means associated therewith for indicating the nature of data stored therein. Instruction modification logic, on the basis of indications of availability of the operand registers, inserts modified source and sink operand register designations in instructions which are then stored in an instruction register stack. Interlock logic controls the transfer of instructions from the instruction register stack to the execution means as a function of the source and sink operand register designations in the modified instructions and the data tags associated with the operand registers.

23 Claims, 14 Drawing Figures

INSTRUCTION EXECUTION UNIT

SUMMARY OF INVENTION

This invention relates generally to digital computers and more particularly to novel and improved instruction execution arrangements.

An object of this invention is to improve computer performance by efficient use of execution units in an arrangement which permits simultaneous execution of independent instruction sequences while preserving the essential precedances inherent in the instruction stream.

Another object of the invention is to provide novel and improved hardware arrangements for the more efficient utilization of components of an instruction execution unit.

Still another object of the invention is to provide a novel and improved instruction execution unit of a type suitable for use in executing floating point instructions.

A further object of the invention is to provide novel and improved arrangements to allow independent sequences of floating point instructions to be executed independently. These independent sequences are defined by Load instructions and the sequence begins when a Floating Point Load instruction is encountered. Normally, interlocks exist in the Floating Point Unit which forces such sequences to be executed serially.

In accordance with the invention, there is provided an instruction execution system including an arithmetic unit, execution means for storing an instruction for controlling of the arithmetic unit, and a plurality of data storage means for use in connection with execution of instructions by the arithmetic unit. The system further includes means for specifying ones of the storage means for specified use in connection with the execution of an instruction, storage logic responsive to an instruction for storing an indication of a specified storage means, and modification logic responsive to the storage logic for inserting in a subsequent instruction the identification of the specified storage means stored by said storage logic.

In a particular embodiment, the invention is used in a Floating Point Unit of a data processing system in which the arithmetic unit includes an adder facility for handling floating point additions and a multiply/divide facility for the multiplication or division of operands applied thereto. Associated with this arithmetic unit is a pool (i.e., a stack) of sixteen working registers, each consisting of a high and low order section, the high or low order section being available for single operands and both sections being available for double operands. Availability logic, responsive to the stack of working registers, provides an indication of the availability of these registers to the Instruction Unit of the data processing system, and Data Valid Logic provides an indication of the availability of an operand stored in a working register.

The Instruction Unit prepares instructions for the Floating Point (Execution) Unit and maps instructions into a format having R1 and R2 fields. A program named register is specified by the R1 field. That register is usually the sink of the instruction, that is, the register expected to receive the result of the execution of the instruction. The second field (R2) of the instruction can specify another program named register (RR instruction), or the location of a source operand (RX instruction). Thus the R1 field typically specifies both a source and a sink while the R2 field specifies a source. It will be apparent that this invention is equally applicable to other systems such as those using separate registers for each source and sink. In this embodiment, the Instruction Unit selects working registers and causes reservations to be inserted in the Availability (Free List) Logic and the Instruction Unit transfers the identity of the selected register with the operand code to the execution unit.

The instruction is transferred by the Instruction Unit into a buffer register in the Execution Unit. Coupled to the buffer register is Transform (storage and modification) Logic and a set of five Instruction Registers which holds Floating Point instructions waiting to go to execution, and from one of which an instruction is transferred to the Execution Register for controlling the operation of the Arithmetic Unit. When a program instruction sequence initially references a general Floating Point Register, the identity of a Working Register selected by the Instruction Unit is stored in the Transform Logic. Each subsequent instruction in that sequence references the Transform Logic and uses that selected register.

Interlock Logic associated with the stack of five Instruction Registers controls the transfer of instructions from the stack to the Execution Register. All instructions remain in strict program sequence until they leave the stack. The Interlock Logic assures that any instructions executed out of sequence will yield the same result as if they had been executed in sequence. The interlock logic looks at up to five instructions per cycle to the Arithmetic Unit as busy as the program allows. In a particular embodiment, five types of interlocks are employed in the Interlock Logic: a Source Sink Interlock, a Data Valid Interlock, a Facility Busy Interlock, a Bus Busy Interlock and a Contender Sequence Interlock. When an instruction is released by the Interlock Logic for execution, a space in the stack is created and the instructions in the stack below that space bubble up to allow a further instruction to enter at the bottom of the stack.

In the Execution Register, the OP code of the instruction is decoded for control of the Arithmetic Unit, the R1 field is decoded and typically a reset signal for the Data Valid tag of the sink register is generated since the data will not be valid in this register again until the present instruction completes execution; and the R2 field is decoded and a signal is transmitted to the availability logic to release the second source register for use by the Instruction Unit in connection with subsequent instructions.

The invention thus provides an instruction execution unit having a pool of data storage means which may be interchangeably used, for example, as floating point registers or buffer registers, and which dynamically selects particular ones from the common pool by renaming the program specified storage means and assigning them to specific instructions to be executed. The invention allows independent sequences of instructions to be executed simultaneously and out of sequence. Further, the interchangeability of data storage means permits an increase in efficiency of usage; and also permits an increase in efficiency when instructions are sequence dependent due to inefficient usage by the program.

The foregoing and other objects, features and advantages of the invention will be apparent from the following more particular description of a preferred embodiment of the invention, as illustrated in the accompanying drawings in which.

Figure 3A:
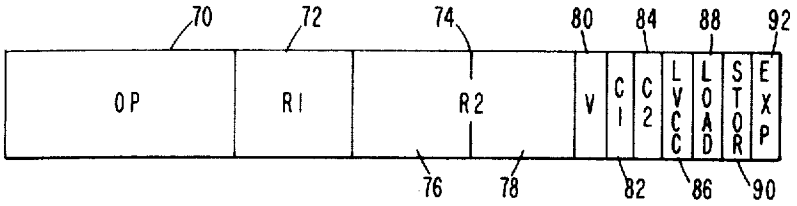
Figure 3B:
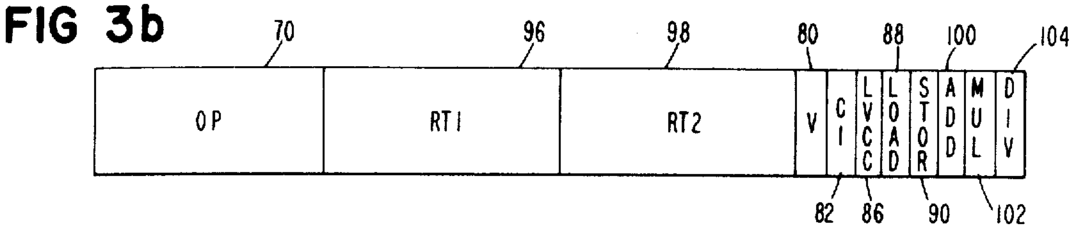
Figure 4:
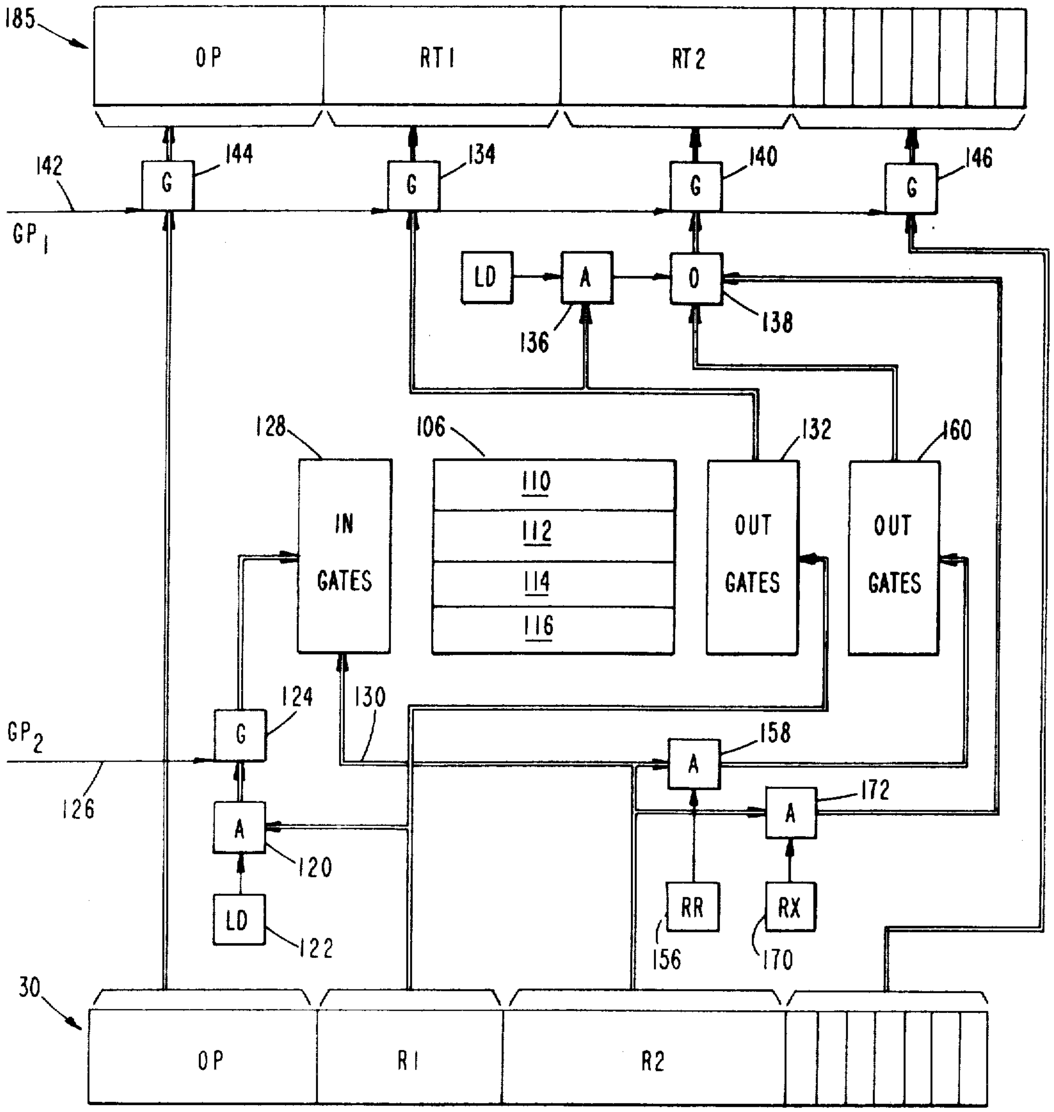
Figure 5:
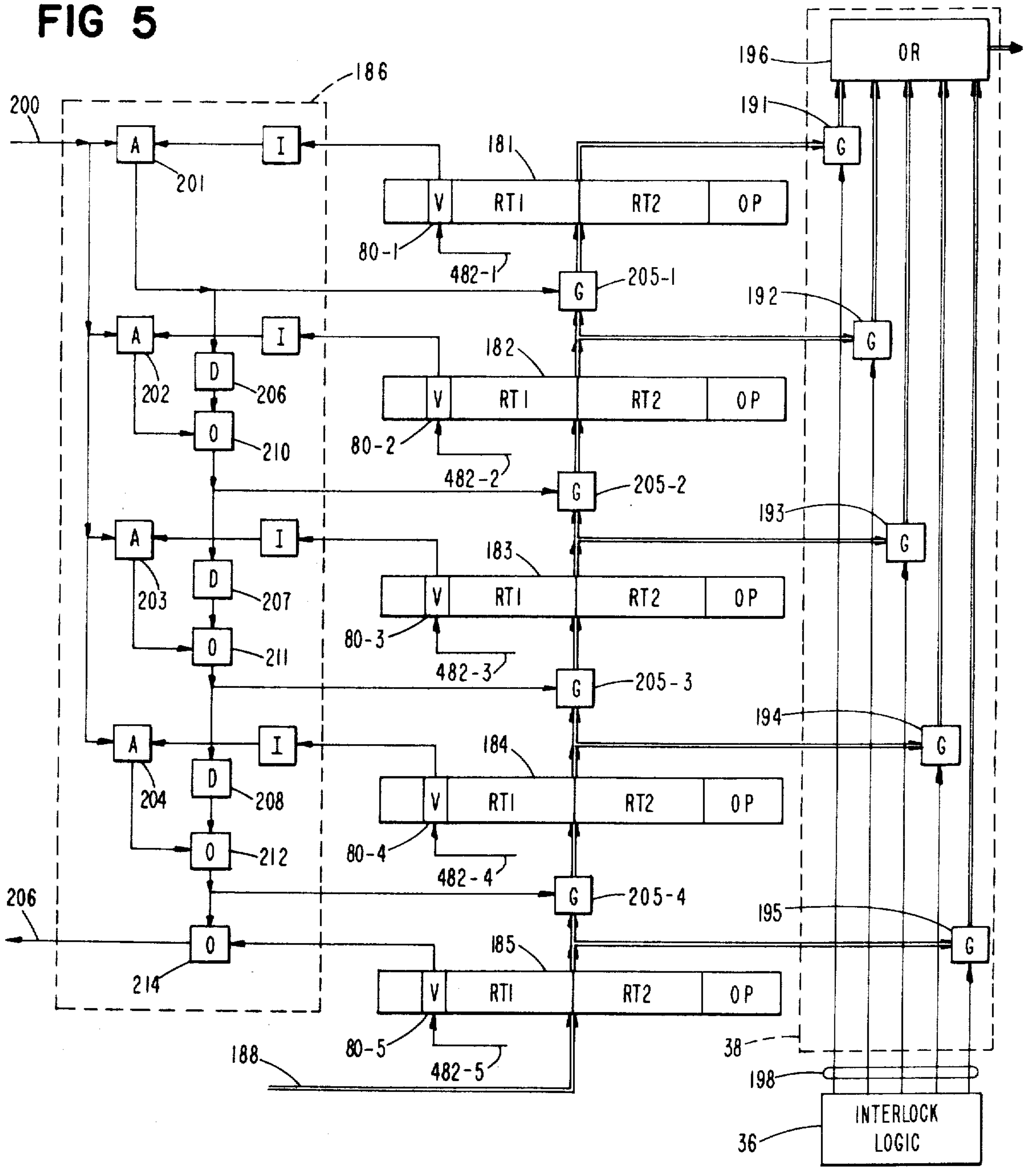
Figures 6D, 6E, 6F, 7:
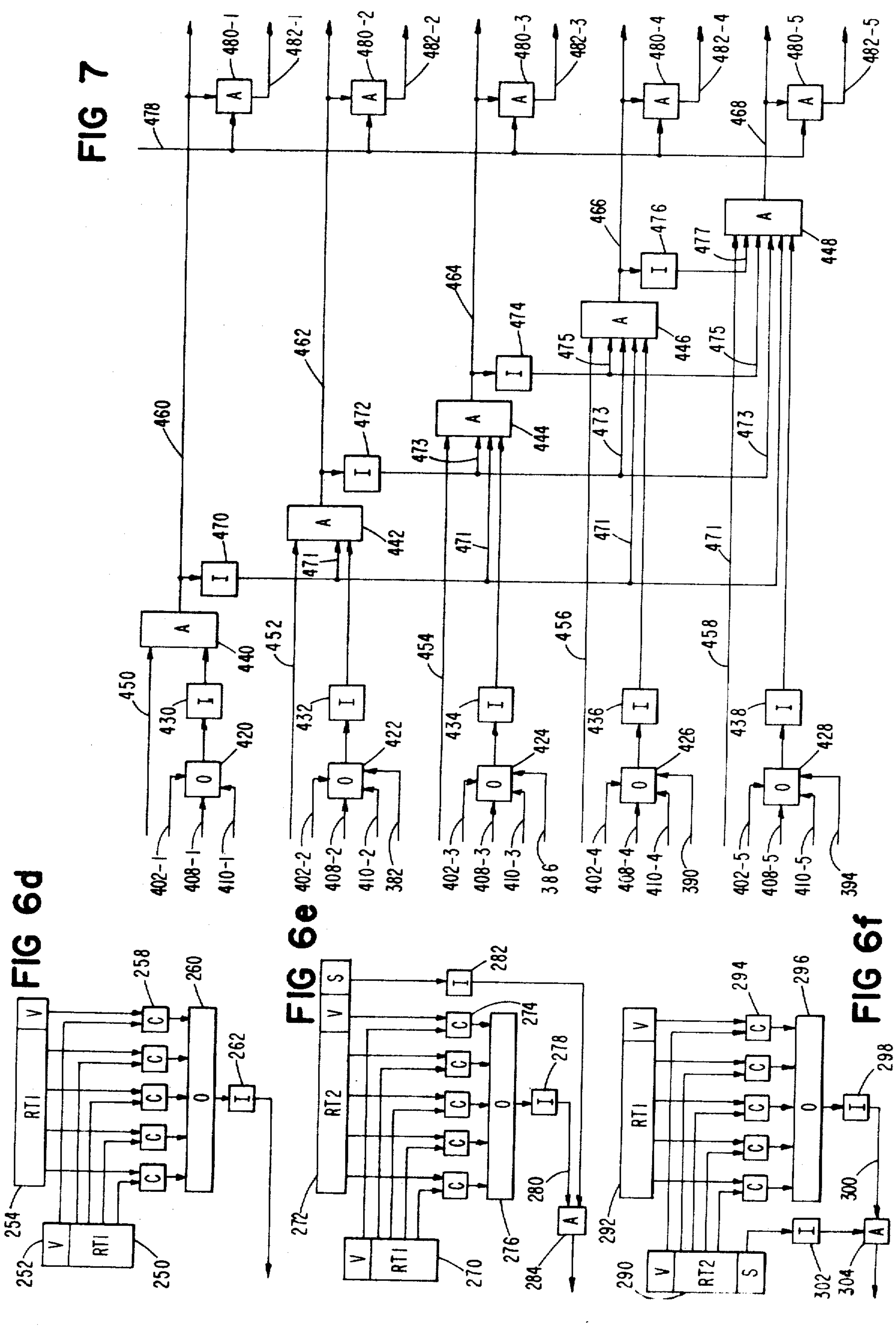
Figure 8:
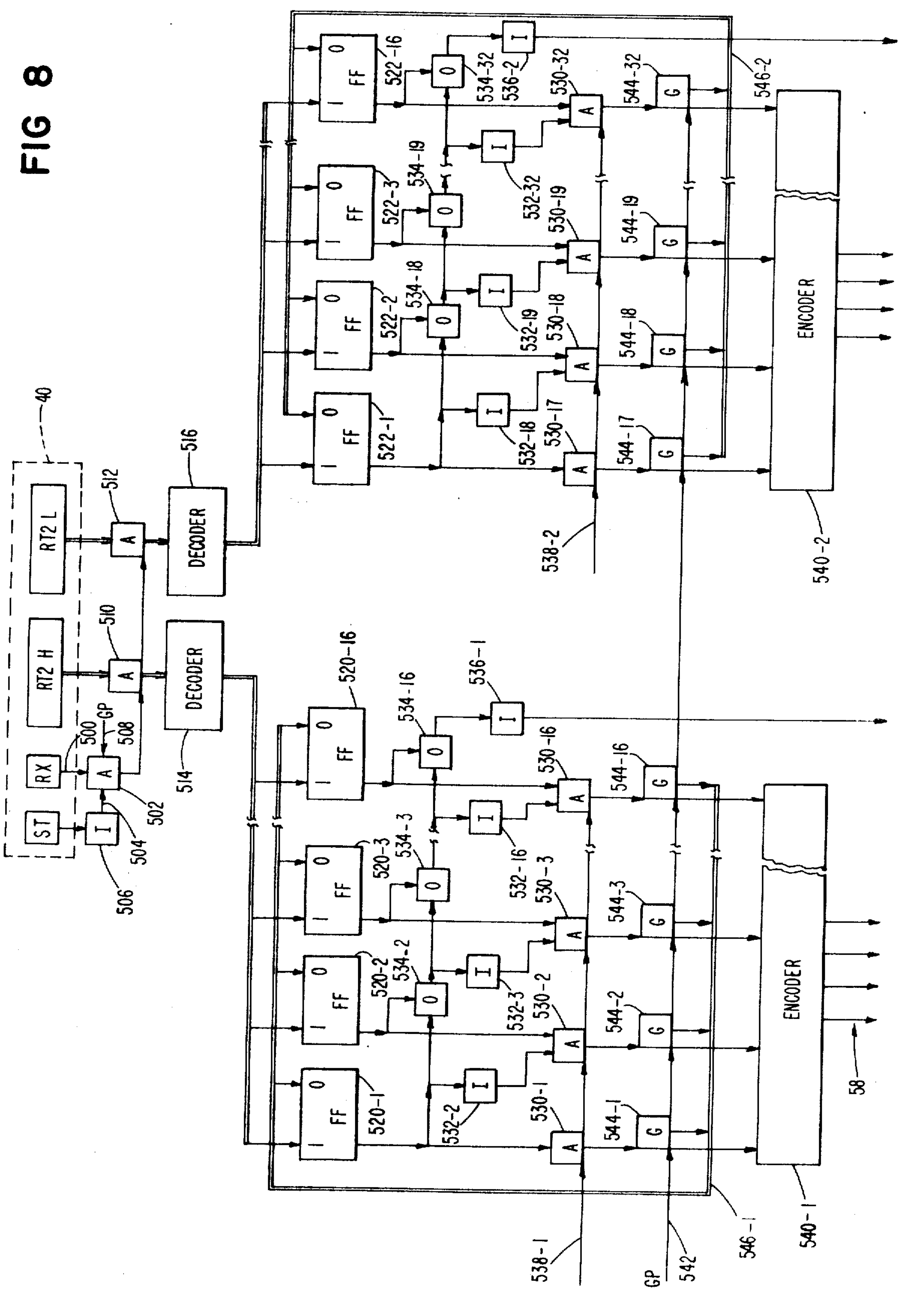

FIG. 3*a* illustrated the instruction format as transferred from the Instruction Unit and FIG. 3*b* illustrates the instruction format of modified instructions as placed in Instruction Register stack 34;

FIG. 4 is a block diagram of the Transform Logic;

FIG. 5 is a block diagram of the Instruction Register stack 34;

FIGS. 6*a*—*f* are logic diagrams of the Source-Sink component of the Interlock Logic 36;

FIG. 7 is a logic diagram of the Contender Sequence component of the Interlock Logic 36; and FIG. 8 is a logic diagram of the Free List Logic 54.

U.S. Patents and patent application related directly or indirectly to the subject application are as follows:

U.S. Pat. No. 3,449,724, issued June 10, 1969 in the name of L. J. Boland et al. and titled "Control System for Interleave Memory;"

U.S. Pat. No. 3,462,744, issued August 19, 1969 in the name of Robert M. Tomasulo et al. and titled "Execution Unit with a Common Operand and Resulting Bussing System;" and U.S. Ser. No. 887,469 filed Dec. 23, 1969 under IBM Docket No. SA67112 in the name of G. M. Amdahl et al. and titled "Storage Control System."

DESCRIPTION OF PARTICULAR EMBODIMENT

Figure 1:
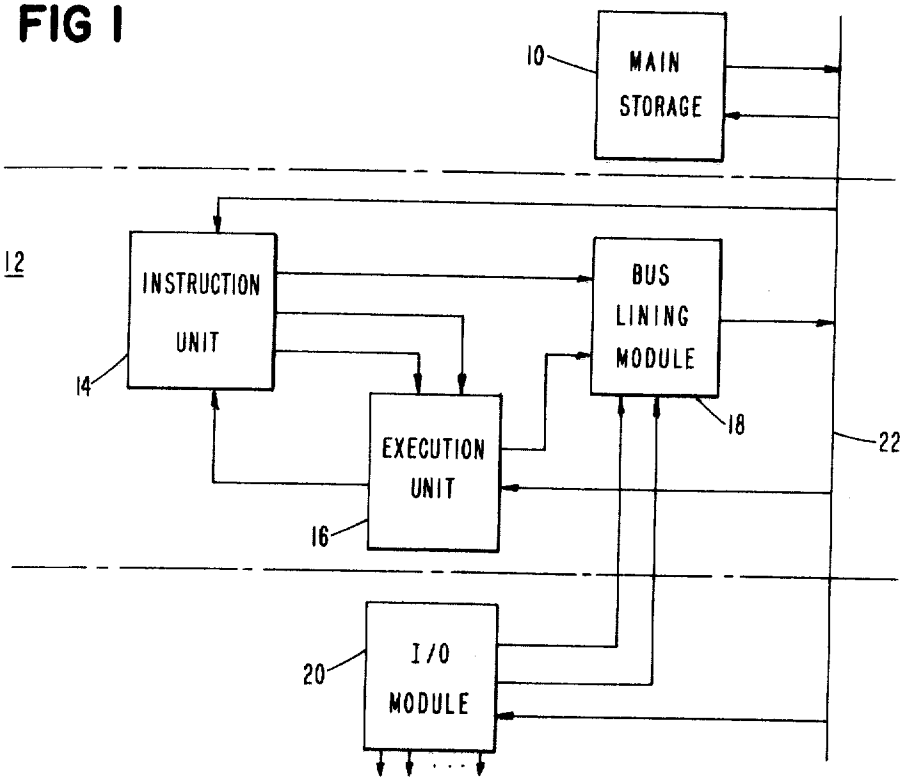
FIG. 1 is a block diagram of indicating instruction and data flow in a computer system incorporating the invention.

The computer organization illustrated in FIG. 1 includes a Main Storage Unit 10, an I/O module 20, and a Central Processing Unit 12 which includes an Instruction Unit 14, an Execution Unit 16, and a Bus Lining Module 18 which controls communications between the Instruction Unit 14, the Execution Unit 16, Main Storage 10 and I/O module 20 via bus 22.

Figure 2:
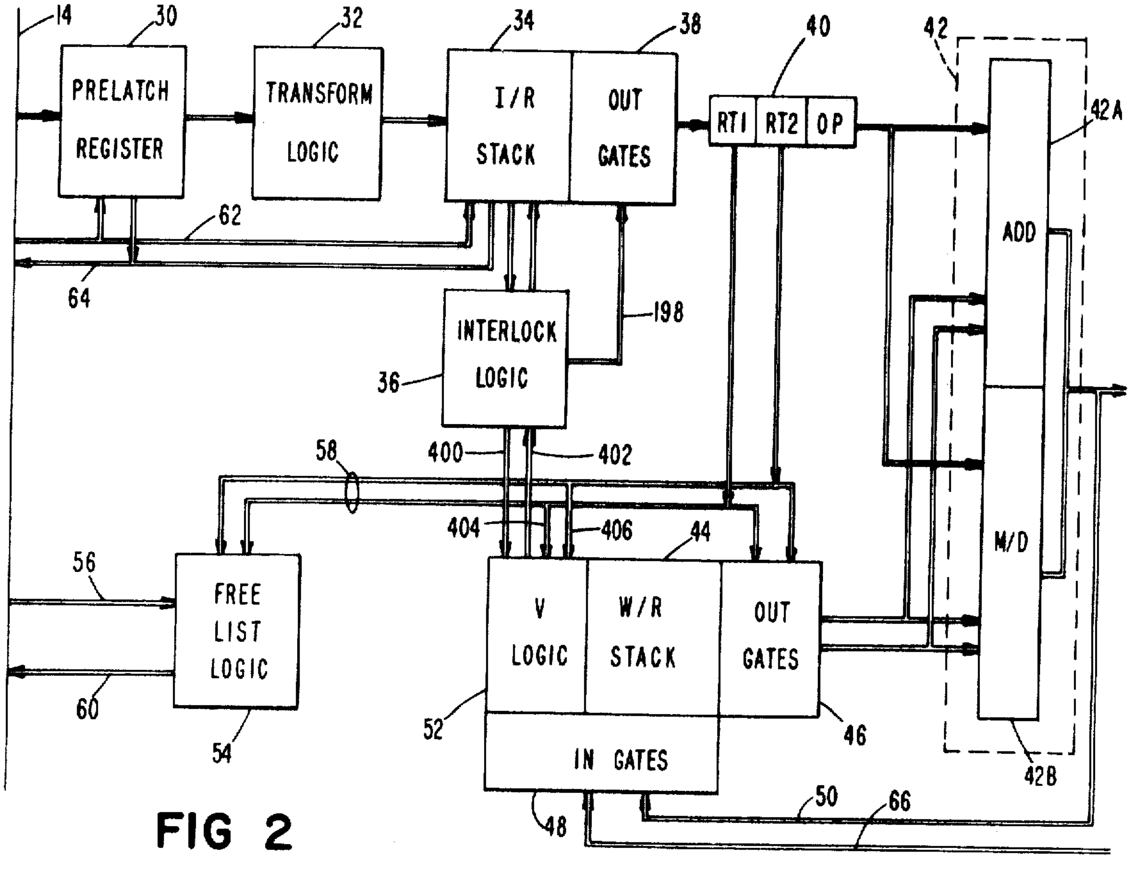
FIG. 2 is a block diagram of the Floating Point Execution Unit of the system shown in FIG. 1.

Further details of Execution Unit 16 are shown in FIG. 2. Instructions coming from the Instruction Unit 14 are loaded into Prelatch Register 30. The instruction resides in Prelatch Register 30 during a rename cycle using Transform Logic 32 and then is transferred to Instruction Register Stack 34, a stack of five registers which hold Floating Point instructions waiting to go to execution. Coupled to stack 34 is Interlock Logic 36 which assures that instructions executed out of sequence yield the same results as if they had been executed in sequence and, by looking at up to five instructions per cycle, keeps the Arithmetic Unit as busy as the instruction codes allow.

The Interlock Logic 36 permits transfer of an instruction from stack 34 through OUT gates 38 to the Execution Register 40. Execution Register 40 holds the instruction for selection of the ADD facility 42*a* or the Multiply-Divide (M/D) facility 42*b* of the Arithmetic Unit 42, controls the selected facility, and typically selects the contents of two registers from the stack 44 of Working Registers for use by the Arithmetic Unit 42. The contents of those selected registers are transferred through OUT gates 46 to the Arithmetic Unit.

Data is loaded into the Working Register Stack 44 through the IN gates 48 from the Arithmetic Unit 42 over lines 50 or from bus 22 over lines 66. Data Valid Logic 52 includes tag bit means corresponding to each Working Register in stack 44. Entry of data into any particular Working Register sets a corresponding tag bit in logic 52 which is sensed by the Interlock Logic 36. Availability (Free List) Logic 54 responds to request signals over lines 56 from Instruction Unit 14 and release signals from Execution Register 40 over lines 58 and supplies indications of the status of the Working Registers in stack 44 to the Instruction Unit 14 over lines 60. In addition, supplemental control information is supplied by the Instruction Unit 14 over lines 62 and further information is applied to the Instruction Unit 14 from Execution Unit 16 over lines 64.

The composition of the instruction word transferred from the Instruction Unit 14 to the Prelatch Register 30 is indicated in FIG. 3*a*. That instruction word includes an eight bit OP code 70 which specifies the Floating Point instruction code; a four bit R1 field 72 which identifies a Floating Point Register as specified by the programmer; an eight bit R2 field 74 which is divided into high and low half fields 76, 78; a valid (V) bit 80 which indicates that the instruction is valid and after modification by logic 32 may be gated to stack 34 on the next cycle; two conditional (C1, C2) bits 82, 84, C1 bit 82 indicating that the instruction is a conditional instruction not to be executed until a conditional branch is resolved and the bit reset, and C2 bit 84 indicating that the instruction is a second level conditionally fetched instruction and as such is held in register 32 until the prior level of conditionality is resolved; an LVCC bit 86 indicating that this instruction is the last condition code setting instruction encountered by the instruction unit 14, and will be reset if unit 14 encounters another condition code setting instruction before the conditional branch occurs; a LOAD bit 88 which is used to control the Transform Logic 32 (if the load is conditional (bit 82 set) no further instruction will be accepted from Unit 14 until the conditionality is resolved); STORE bit 90 which causes the five bits of the R2 field to bypass the Transform Logic 32 and be transferred directly to stack 34; and an Extended Precision (EXP) bit 92 which indicates that the instruction is of the extended precision type and causes the instruction to be held in Register 32 until all instructions in stack 34 have been executed (the instruction then being sent directly to Register 40 from Register 30).

Control signals from Unit 14 applied over lines 62 include a Reset LVCC signal indicating that another condition code setting instruction has been sensed by Unit 14 so that all prior LVCC bits should be reset; two Reset Condition signals, one for first level (bit 82) and one for second level (bit 84); and two Invalidate Condition signals (one for each level of conditionality), each of which invalidates the conditional instruction(s) (clears the VALID bit) as a function of the resolution of a conditional branch, as the selected instruction(s) are the wrong one(s).

Signals over lines 64 from the Execution Unit 16 to the Instruction Unit 14 include an Operation Complete signal indicating that all the instructions previously sent to the Execution Unit have been completed; a signal indicating that a register in stack 34 is empty so that an instruction can be accepted from the Register 30; and a signal indicating that Register 30 is empty.

There are thirty-two lines in cable 60, one for each Working Register in stack 44 and these lines identify to the Instruction Unit the Working Register that is selected in response to a request from the Instruction Unit on line 56. That furnished identity (typically high and low addresses that identify two registers--effectively a double register) is inserted in the R2 field 74 by the Instruction Unit 14 before the instruction is transferred to the Prelatch Register 30.

The Transform Logic 32 senses the contents of the R1 and R2 fields 72, 74 and places modified contents in the RT1 and RT2 fields 96, 98 of an instruction format as shown in FIG. 3*b*. That instruction format includes the same operation code 70 and bits 80, 82, 86, 88 and 90. In addition, between Register 30 and stack 34 sufficient decoding is done to specify the arithmetic facility required by the instruction, bit 100 being set if the instruction will use Adder 42*a*, bit 102 being set if it is a multiply instruction and bit 104 being set if it is a divide instruction.

Details of the Transform Logic 32 are shown in FIG. 4. This logic permits any one of the 32 working registers in stack 44 to be used interchangeably as an RX instruction buffer or as one of four Floating Point Registers. When the programmer selects one of the Floating Point Registers 0, 2, 4 or 6, Instruction Unit 14 in response selects one of the sixteen double word registers in stack 44 as that Floating Point Register for use by subsequent instructions. Similarly Unit 14 selects an available Working Register for use as a source register in RX instructions. Each instruction loaded into Prelatch Register 30 is operated on by Transform Logic 32 so that a modified instruction (the RT1 and RT2 fields being generated as a function of the OP code 70 and the R1 and R2 fields 70 and 72) is generated and each such instruction is loaded into the lowest Instruction Register 185 in stack 34.

The contents of the RT1 and RT2 fields are determined by the type of instruction. In a load (LD) instruction, the identity of a selected Working Register in stack 44 is loaded into Transform List 106 and both the RT1 and and RT2 fields are loaded with the identification of the Working Register in stack 44 that has been replaced by the new register selected by the Instruction Unit for use as the Floating Point Register. In a register to register (RR type) instruction, the Transform List 106 in the Transform Logic 32 is referenced and the addresses of two previously selected registers in stack 44 are gated into the RT1 and RT2 fields, respectively. In an RX type of instruction (other than LOAD), Unit 14 has selected a buffer register in stack 44 as determined by the indication of availability from the Free List Logic 54 over lines 60. The R1 field of the RX instruction identifies the program selected Floating Point Register (sink) and the R2 field identifies the Working Register selected as the destination register for the data fetch (source). In a Store instruction the five high order bits of the R2 field specify a sequence tag which is sent to Module 18 with the store data and partially identify the proper memory address.

The Transform Logic, as shown in FIG. 4 includes Transform List 106 which contains four register 110, 112, 114 and 116 that correspond to the functional Floating Point Registers 0, 2, 4 and 6. As indicated above, in a LOAD instruction, the R1 field 72 identifies the particular program selected Floating Point Register and the R2 field identifies the Working Register of stack 44 selected by Instruction Unit 14. AND circuit 120 is conditioned by a decoded LOAD instruction indication (diagrammatically indicated at 122) and the R1 field is passed by AND circuit 120 to condition gate 124. When gate 124 is sampled by a pulse on line 126, the corresponding one of the four sets of IN gates 128 is conditioned and the address of a Working Register identified by the R2 field is loaded into the selected register in the transform list 106 via lines 130. The prior contents of that register are transferred as specified by the R1 field via OUT gates 132 for passage through Gates 134 and through the conditioned AND circuits 136, OR circuits 138 and gate 140 to the RT1 and RT2 fields in response to a gating pulse on line 142. The OP code 70 and control bits as indicated above are passed directly to the lowest register in stack 34 by gates 144 and 146 respectively in response to the pulse on line 142. Thus in response to a LOAD instruction, the Transform Logic 32 "renames" a Working Register of stack 44 as a Floating Point Register 0, 2, 4 or 6 and the previous "rename" of that Floating Point Register is transferred to the RT1 and RT2 fields for use by the Interlock Logic 36 while that instruction is moving through the Instruction Register stack 34. This keeps those register names from being released on the Free List Logic until the instruction has been passed to the Execution Register 40 (the only executable act of the Load instruction being to free the specified Working registers).

In an RR type of instruction, the R1 and R2 fields contain real Floating Point Register names and thus point to the positions in the transform list 106 which contain the renames for those registers. The rename of the Floating Point Register specified by the R1 field is passed by OUT gates 132 to condition gates 134; and the decoded RR instruction 156 conditions AND circuit 158 which in turn conditions the specified ones of a second set of OUT gates 160 to transfer the specified rename out through OR circuits 138 to condition gates 140. In response to the gating pulse on line 142, these Working Register identifications are loaded into the RT1 and RT2 fields respectively, along with the operation code directly from register 30 through gates 142 and control bits (including added control bits on the basis of decoding) through gates 144.

In an RX type of instruction (except Load), Unit 14 obtains a register identification from Free List Logic 54 as the destination register for a fetched source operand. The R1 field of the instruction in Register 30 contains the real FPR name and the R2 field contains the identification of the selected source register. The decoded RX instruction indication 170 conditions AND circuit 172 and the R2 field is passed through OR circuit 138 to condition gates 140. The rename of the Floating Point Register specified by the R1 field is applied to gates 134. The gating pulse on line 142 then samples gates 134, 140, 144 and 146 to transfer the revised RX instruction format into the lowest register of stack 34 in manner similar to that previously described.

If the instruction is of the STORE type, the three low order bits of the R2 field are unused and the five high order bits of that field are a sequence tag assigned by Unit 14 at effective address generation time, which tag is set to Module 18 along with the STORE data to identify it with the proper memory address. The R1 field of the STORE instruction specifies the Floating Point Register whose contents are expected to be the source of the operand to be placed in Main Storage 10 and its contents are passed by OUT gates 132 to condition gates 134 to load the indicated register identification into the RT1 field. The R2 field is passed by OR circuit 138 and gates 140 to the RT2 field 98.

As shown in FIG. 5, the IR stack 34 contains five registers 181–185 that hold floating point instructions waiting to go to execution. An instruction enters at the bottom of the stack (register 185) and the instructions move ("bubble") up one position in each cycle if there is an available register above. An available register is created, for example, by an instruction being sent to the Execution Register 40, the valid bit 80 being cleared when the instruction is sent to execution and those bits being used to sense available registers. With reference to FIG. 5, the stack 34 includes five registers 181–185 and bubble up logic 186 responsive to the valid bits 80–1 - 80–5 of the instructions stored in the registers 180–185. An instruction is loaded into register 185 from register 30 via Transform Logic 32 over lines 188. Instructions are transferred from registers 181–185 through OUT gates 191–195 and OR circuit 196 to the Execution Register 40 as a function of signals over output lines 198 from interlock logic 36, a signal on one of lines 198 conditioning a corresponding set of gates for the transfer and a subsequent signal on line 482 resetting the valid bit 80 of the instruction being transferred. After the transfer has been completed the bubble up logic 186, in response to a gating pulse applied on line 200 samples AND circuits 201–204 and transfers, in sequence as a function of the location of the available ("empty") register, the instructions up to each next higher register. For example, if the interlock logic 36 specifies that a transfer may be made of the instruction stored in register 182, gate 192 is conditioned. After the transfer has occurred, valid bit 82–2 is cleared and the bubble up logic 186 senses the availability of register 182 and conditions in sequence gates 205–2, 205–3, and 205–4 via delay circuits 206–208 and OR circuits 210–212 to transfer instructions from registers 183–185 to registers 182–184, making register 185 available to receive the further instruction from register 30 as signalled by the output signal from OR circuit 214 on line 206.

The Interlock Logic 36 is designed to insure that execution of instructions out of sequence yield the same results as if the instructions had been executed in sequence, and by looking at up to five instructions in each cycle, the Arithmetic Unit 42 is kept as busy as the instructions allow. In this particular embodiment, five different interlocks are employed:

Source - Sink interlock,
Data Valid Interlock,
Facility Busy interlock,
Bus Busy interlock, and
Contender Sequence interlock.

The Source-Sink interlock interrogates the RT1 and RT2 fields of each instruction contending for execution and when two or more instructions reference the same Working Register, the newer instruction may have to be interlocked to preserve the integrity of the results. The Data Valid interlock inhibits an instruction from going to execution if the data in the register specified by the RT1 or RT2 fields is not valid, due for example to the fact that the data may be the result of execution of a previous instruction that is still in process or requested data may not have been returned yet (memory fetch in process). The Facility Busy interlock applies only to multiply and divide instructions as the Multiply-Divide facility 42b cannot accept new instructions each cycle. As each multiply or divide instruction goes to execution, it sets an appropriate busy bit and two cycles before the facility could actually accept another instruction, that busy bit is turned off releasing the Facility Busy interlock. This allows one cycle for a successful interlock and one cycle to bus new operands so that the facility can be used again without losing a cycle. Where there is only one result return bus from the arithmetic unit 42 to the register stack 44, no instruction can be sent to execution that will complete at the same time as another instruction previously sent to execution and the Bus Busy interlock supervises this condition. Finally, the Contender Sequence interlock selects the oldest instruction in stack 34 which is not otherwise interlocked and allows that instruction to go to the Execution Register 40.

Figure 6A:
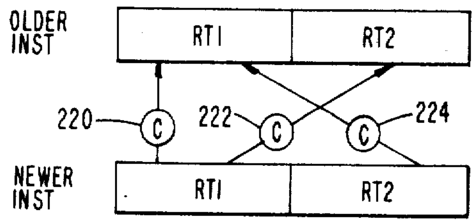

Logic diagrams relating to the Source-Sink (SS) interlock are shown in FIGS. 6*a–f*. Typically, each instruction contending for execution requires one or two registers for source operands and one register for a result sink. For the SS interlock, the RT1 field is considered to identify both a Source and a Sink while the RT2 field can only identify a Source. With these assumptions, the SS interlock is accomplished with three compares with respect to each pair of instructions as indicated in FIG. 6*a*. A first Compare 220 between the RT1 fields of the older and newer instructions insures that the newer instruction will not use a register as a Source until the older instruction has returned a result to that Sink. The second Compare 222 insures that the newer instruction will not use a register as a Sink until the older instruction has used it as a Source. The third Compare 224 insures that the newer instruction does not use a register for a Source until the proper result has been put in that register by the older instruction.

Figure 6B:
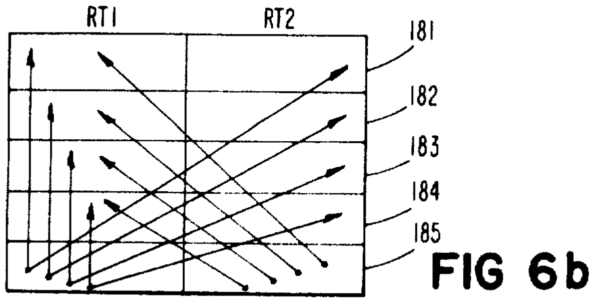

FIG. 6*b* shows the twelve comparisons are required for the names specified by register 185. The total SS interlock in such an embodiment requires thirty compares. The Compares need only be made upwards as shown in FIGS. 6*a* and 6*b* since the oldest instructions are at the top of the stack 34 and the newest are at the bottom.

Figure 6C:
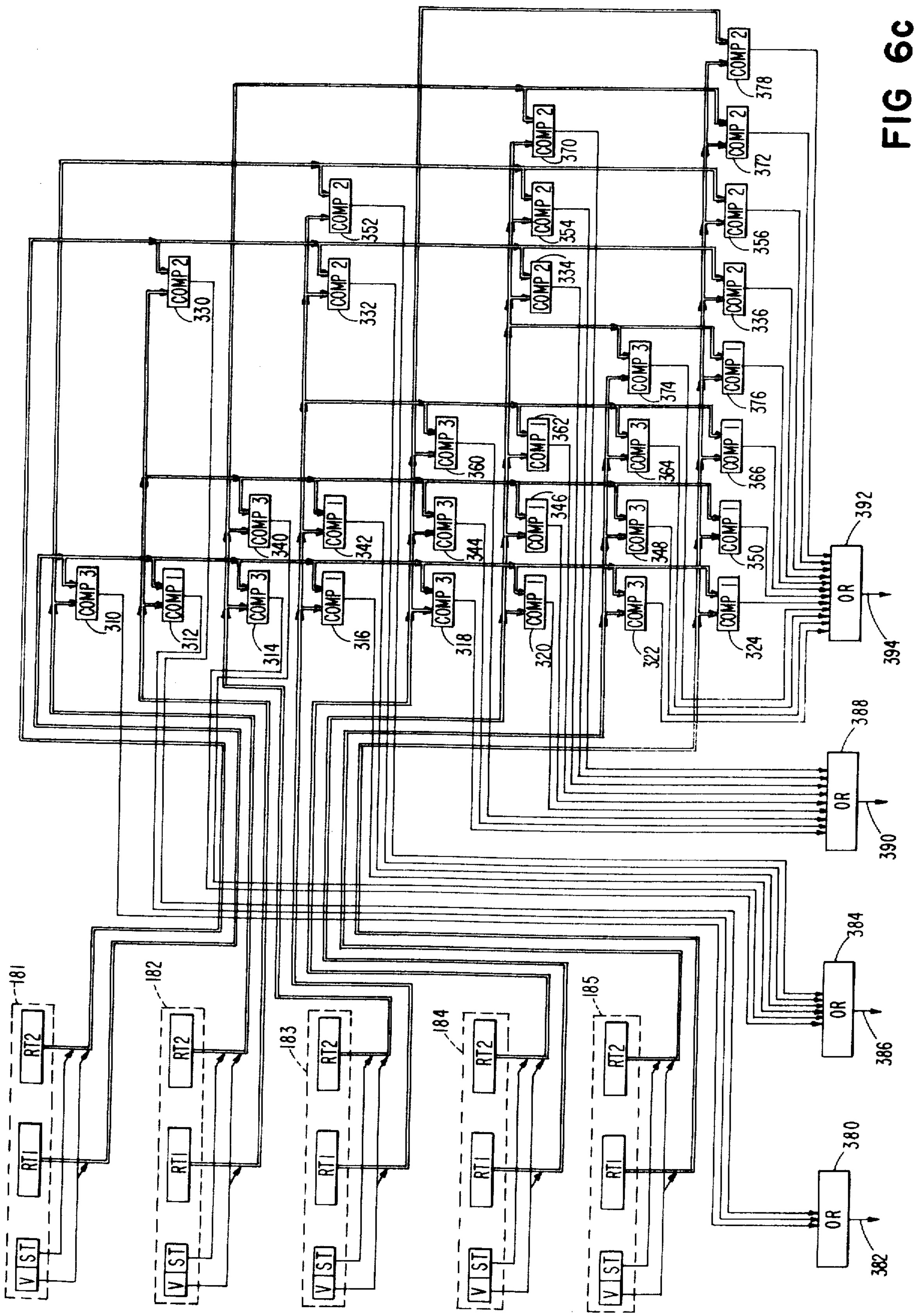

A logic diagram of the Source Sink interlock is shown in FIG. 6*c*. That interlock employs three different types of compare circuit configurations as indicated in FIGS. 6*d*, *e* and *f*, respectively. In a first type 220 of compare (COMP 1) (FIG. 6d) the RT1 bits 250 and the valid bit 252 associated with one instruction are compared with the RT1 bits 254 and the valid bit 256 of the instruction in the next higher register. The output of any Compare (exclusive OR ) circuit 258 indicates lack of comparison and produces an output from the OR circuit 260 to remove the interlock signal from the output of inverter 262.

The second type 222 of Compare (COMP 2) is shown in FIG. 6*e* in which the RT1 and valid bits 270 in a lower register are compared with the RT2 and valid bits 272 in a higher register by compare circuits 274, OR circuit 276 and inverter 278 in a manner similar to the comparison of FIG. 6d and if a comparison occurs an output is generated on line 280. However, this interlock signal is inhibited if the instruction is a store instruction by inverter 282 and AND circuit 284.

The third type 224 of Compare (COMP 3) is between the RT2 and valid bits 290 in a lower register and the RT1 and valid bits 292 in a higher register by means of compare circuits 294, OR circuit 296 and inverter 298 to generate an interlock signal on line 300. Again, a similar inhibit on the interlock is effected if the instruction in the lower register is a store instruction via inverter 302 and AND circuit 304.

Source Sink interlock logic is shown in FIG. 6*c*. As there indicated, signals from the RT1 field of the instruction in the first instruction register 181 are applied to compare circuits 310, 314, 318 and 322 of the type shown in FIG. 6*f* (COMP 3) and to compare circuits 312, 316, 320 and 324 of the type shown in FIG. 6*d* (COMP 1). Signals from the RT2 field in that register are applied to compare circuits 230, 232, 234 and 236 of the type shown in FIG. 6*e* (COMP 2). Similarly, signals from the RT1 field of the instruction in the second register 182 are applied to second inputs of compare circuits 312 and 330, and the first inputs of compare circuits 340, 342, 344, 346, 348 and 350. The RT1 field of the third register 183 is applied to the second inputs of Compare circuits 316 and 342, 332 and 352 and the first inputs of compare circuits 360, 362, 364, 366; and the RT2 field is applied to the second inputs of compare circuits 314 and 340 and the first inputs of compare circuits 370 and 372. The RT1 field of the instruction in the fourth register 184 is applied to the second inputs of compare circuits 320, 346, 362, 334, 354 and 370 and to the first inputs of compare circuits 374 and 376; while the RT2 field of that instruction is applied to the second inputs of compare circuits 318, 344 and 360 and to the first input of compare circuit 378. The RT1 field of the instruction in register 185 is applied to the second input of compare circuits 324, 350, 366, 376, 336, 356, 372 and 378; and the RT2 field of that instruction is applied to the second inputs of compare circuits 322, 348, 364, and 374.

If any compare circuit has an output it generates an interlock signal, the interlock signal for the second register 182 being applied through OR circuit 380 on line 382, for the third register 183 through OR circuit 384 on line 386, for the fourth register 184 through OR circuit 388 on line 390 and for the fifth register 185 through OR circuit 392 on line 394.

The Data Valid interlock senses the status bits associated with the Working Registers in stack 44 that are specified by the RT1 and RT2 fields of each instruction in stack 34. When data is stored in a register in stack 44, as indicated above, the corresponding Data Valid bit in logic 52 is set. The RT1 and RT2 fields of each instruction in stack 34 are decoded and the resulting output, in each interlock cycle, is applied over lines 400 to logic 52 to sample the Data Valid bit of the corresponding Working Register in stack 44. If that valid bit is not set, a signal is returned over lines 402 as a Data Valid interlock signal for that register, to prevent use of the instruction in that register in the next execution cycle. There are two reasons why the data may not be valid. The specified register may be a sink register for the result of a previous instruction which is still in process, or the operand supplying equipment may not have yet completed a requested transfer of an operand from memory 10. In order for an instruction not to be DV interlocked, all RT addresses must have valid bits (except for the LOAD instruction and the RT2 field of a Store Instruction). The Data Valid bits specified by the RT1 and RT2 fields of an instruction are reset at execution time by signals on line 404 and 406.

A similar interlock is the Facility Busy interlock which in this embodiment applies only to multiply and divide instructions and prevents subsequent use of the M/D facility 42*b* by another instruction until a previous instruction has been sufficiently completed to permit a further use of the facility. In this particular embodiment, the facility busy bit is turned off two cycles before the facility could actually accept another instruction and the interlock signal removed from line 408, this allowing one cycle for a successful interlock and one cycle to bus new operands so that the facility can be used again without losing a cycle. In similar manner it may be desirable to interlock a bus, for example where there is only one result return bus from the Arithmetic Unit to the register stack 44. In this interlock an instruction will be interlocked with any other previous uncompleted instruction if the second instruction would complete the same time as the previous instruction, this interlock being indicated by a signal on line 410.

A final interlock is a Contender Sequence interlock, the logic of which is shown in FIG. 7. That interlock logic selects the oldest instruction in stack 34 that is not otherwise interlocked. As indicated in FIG. 7, the interlock signals of each register are applied to corresponding OR circuits 420, 422, 424, 426 and 428, respectively. The output of the OR circuit is applied through a corresponding inverter 430–438 to one input of AND circuit 440–448, respectively. A signal gated by the instruction valid bit 80 is applied to a second input 450–458 of each AND circuit. If the instruction in the first instruction register 181 is a valid instruction and its interlock OR circuit 420 does not provide an output signal, AND circuit 440 is conditioned and provides an output over line 460 as a gate conditioning level for transfer of the instruction from that register to the Execution Register 40 and via inverter 470 inhibits transfers from all other registers in stack 34. After the instruction is transferred, a gating pulse applied on line 478 samples the conditioned AND circuit 480, and its output is applied on line 482 to reset the valid bit 80 in the corresponding register in stack 34, thus indicating a hole in the stack 34 and allowing the instructions to bubble up through that stack in response to a gating pulse on line 200 into the top four registers leaving the fifth register 185 available for receipt of another instruction from the Prelatch Register 20.

Should the instruction in register 181 not be valid (due, for example, to a condition just having been resolved and invalidating this instruction) or the instruction is interlocked, for example due to the Facility Busy interlock signal on line 408–1, AND circuit 440 will not have an output and inverter 470 provides an output to condition the third inputs 471 of AND circuits 442–448. If the other two inputs are conditioned, the resulting signal on output line 462 permits an instruction to be transferred from Instruction Register 182 to the Execution Register 40, and after that transfer is accomplished, the valid bit of that instruction is reset by an output from AND circuit 480–2. Should both registers be interlocked, register 183–185 are similarly checked in sequence for an available instruction to be transferred to Execution Register 40.

Details of the Free List Logic 54 is indicated in FIG. 8. The Free List Logic specifies those registers in stack 44 that are available for selection by Unit 14. If the register is selected as a Floating Point Register, it remains selected until that selection is changed by another LOAD instruction. If the register is to be used as a buffer register, that register can be made available as soon as the RT2 field is in the Execution Register 40. Thus the register specified by the RT2 field of an execution instruction (other than STORE) is released when the instruction is in the Execution Register 40. In the Execution Register 40 the OP code is decoded and if the instruction is of the RX type, an output is generated on line 500 to condition one input of gate AND circuit 502. If the instruction is not a STORE instruction, the output on line 504 from inverter 506 conditions the second input of AND circuit 502. When a gating pulse is applied on line 508, it is passed by AND circuit 502 to sample gates 510 and 512. These gates pass the RT2 field bits to decoders 514 and 516 and the resulting output on one of sixteen lines from each decoder sets the corresponding flip flops 520–1 – 520–16, 522–1 – 522–16 to provide an indication that the registers corresponding to those flip flops are available. The ONE output of each flip flop conditions an AND circuit 530 and also removes conditioning inputs from all subsequent AND circuits 530 and also removes conditioning inputs from all subsequent AND circuits 530 via inverter 532 and OR circuits 534. Thus one AND circuit 530 corresponding to the highest register that is available according to the setting of flip flops 520, 522 in each of the high and low sections of stack 44 is conditioned. If OR circuit 534–16 or 534–32 does not have an output, signals are sent via inverters 536–1 or 536–2 over lines 58 to the Instruction Unit 14 indicating that there is no available register. When the Instruction Unit 32 desired to select a Working Register, a signal is sent over line 538–1 and/or –2. (Double register selection may be accomplished by simultaneous sampling of corresponding flip flops 520 and 522.) The output of the conditioned AND circuit 530 is applied to encoder 540 which produces an encoder output on lines 58 for application to unit 14. In each cycle, a gating pulse applied on line 542 and passed by the conditioned gate circuit 544 to provide an output on the corresponding line in cable 546 to reset the corresponding flip flop 520 and/or 522 as an indication that the Instruction Unit 14 has reserved the Working Register specified by that flip flop.

With reference to FIG. 2, when the instruction is in Execution Register 40, the OP code of the instruction is applied to control the arithmetic unit 42 and the RT1 and RT2 fields 96 and 98 condition corresponding OUT gates 46 of the Working Register stack 46 to transfer their contents to the Arithmetic Unit 42 for use in the processing of the instruction. Each loading of data into the stack either from the bus over lines 66 or from the Arithmetic Unit over lines 50 sets a corresponding valid bit in the Valid Logic 52, and each transfer of data from a register clears the corresponding valid bit thus controlling via the Data Valid interlock use of that Working Register. If the instruction in the Execution Register 40 is a Store or Compare instruction (they do not change the contents of the indicated sink register) this reset is inhibited. Zero, one or two operands are outgated from the Working Register stack 44 depending on the nature of the instruction. On instructions that use the Adder, the sink register name is transferred from the Execution Register 30 to a sequencing means to provide a pre-execution cycle delay and then open the appropriate stack IN gates 48 to store the result. On multiply and divide instructions the sink register address is specified by the sequencing means when the M/D facility 42b is three cycles from completion. That address is decoded in the next cycle, the Data Valid bit for that register is turned on in the next cycle and in the third cycle the appropriate IN gates 48 are conditioned to receive the result. Should that address also appear in the RT1 or RT2 fields of the instruction then in the Execution Register 40, a bypass gate is opened, the operand is bussed to the appropriate Arithmetic Unit 42 and the corresponding Data Valid bit is cleared.

Only one Extended Precision instruction (bit 92 set) is permitted in the Floating Point Unit at a time as three to four full registers are required and a longer execution time is involved. Therefore, when an Extended Precision instruction reaches the Prelatch Register 30, no further instructions will be accepted from Instruction Unit 14 and all instructions previously entered into the Execution Unit 16 from the Instruction Unit 14 are executed except for the instruction in the Prelatch Register 30. That instruction is then transferred directly to the Execution Register 40 and to a duplicate Execution Register which holds the added register names. The R1 and R2 fields of the Extended Precision instruction pass through the Transform Logic 32 to take into account any renaming that may have occurred but only the DV interlock of the Interlock Logic 36 applies. Once the Extended Precision instruction is in the Execution Register 40, stack 34 can start refilling but no instruction will be allowed to go to execution until execution of the Extended Precision instruction is complete.

While the invention has been particularly shown and described with reference to a preferred Floating Point Execution Unit embodiment thereof, various modifications thereof will be apparent to those skilled in the art and therefore it is not intended that the invention be limited to the described embodiment and details thereof and changes in form and details may be made therein without departing from the spirit and scope of the invention.

What is claimed is:

1. An instruction execution system comprising an arithmetic unit, execution means for storing an instruction for controlling said arithmetic unit;

further means for storing at least one subsequent instruction;

a plurality of data storage means for use in connection with execution of instructions by said arithmetic unit under the control of an instruction stored in said execution means, means for specifying one of said data storage means for use in connection with the execution of an instruction, storage logic responsive to an instruction for storing an indication of said one of said data storage means specified by said specifying means, and modification logic responsive to said storage logic for inserting in said subsequent instruction the indication of said specified data storage means stored by said storage logic.

2. The system as claimed in claim 1 wherein each said instruction includes a data storage means specifying field and said storage logic includes a plurality of storage means, means responsive to a data storage means specifying field of a first instruction for changing the contents of storage means in said storage logic and means in said modification logic for reading out the contents of storage means in said storage logic as a function of a data storage means specifying field of a subsequent instruction.

3. The system as claimed in claim 1 wherein each said instruction has a plurality of data storage means specifying fields and said storage logic includes means responsive to the contents of first and second data storage means specifying fields of an instruction for changing the contents of storage means in said storage logic and means responsive to a data storage means specifying field of a subsequent instruction for reading out the contents of storage means in said storage logic.

4. The system as claimed in claim 1 and further including data logic for storing indications of validity of data stored in said data storage means.

5. The system as claimed in claim 4 and further including interlock logic responsive to said data logic controlling the transfer of instruction to said execution means.

6. The system as claimed in claim 1 wherein said storage logic includes a plurality of means for storing indications corresponding to specific program named registers.

7. The system as claimed in claim 1 and further including a plurality of instruction storage means for holding instructions waiting transfer to said execution means and interlock logic for controlling the transfer of instructions from said instruction storage means to said execution means.

8. The system as claimed in claim 7 and further including availability logic for providing indications of the data storage means for use in connection with execution of instructions, and means for changing said indications in said availability logic as a function of execution of instructions.

9. The system as claimed in claim 7 wherein said interlock logic includes precedence logic for releasing the oldest non-interlocked instruction in said instruction storage means.

10. The system as claimed in claim 1 wherein said arithmetic unit has a plurality of facilities and further including interlock logic for releasing instructions for transfer to said execution means as a function of the availability of said arithmetic unit facilities.

11. The system as claimed in claim 1 and further including availability logic for providing indications of the data storage means available for use in connection with execution of instructions, and means for changing said indications in said availability logic as a function of execution of instructions.

12. The system as claimed in claim 1 wherein each said instruction has a plurality of data storage means specifying fields and further including interlock logic for controlling the transfer of instructions to said execution means as a function of the contents of the data storage means specifying fields of successive instructions.

13. The system as claimed in claim 12 and further including data logic for storing indications of validity of data stored in said data storage means.

14. The system as claimed in claim 13 wherein said interlock logic further includes logic responsive to said data logic controlling the transfer of instructions to said execution means.

15. The system as claimed in claim 14 wherein said arithmetic unit has a plurality of facilities and said interlock logic further includes logic for releasing instructions for transfer to said execution means as a function of the availability of said arithmetic unit facilities.

16. The system as claimed in claim 15 wherein said interlock logic further includes precedence logic for releasing the oldest non-interlocked instruction in said instruction storage means for transfer to said execution means.

17. The system as claimed in claim 16 and further including availability logic for providing indications of the data storage means for use in connection with execution of instructions, and means for changing said indications in said availability logic as a function of instruction requests and execution.

18. An execution unit for instructions having sink and source operand designations wherein the source designation specifies the location of an operand and the sink designation specifies a location expected to receive the result of the execution of its instruction comprising an arithmetic unit, execution means for holding an instruction for controlling said arithmetic unit, a plurality of operand registers, each having tag means associated therewith for indicating the nature of the data stored therein, means for inserting identifications of a first particular one of said operand registers to receive a source operand requiring a memory fetch, and a second particular one of said operand registers to receive the result of the execution of an instruction in an instruction to generate a modified instruction, and means for transferring said modified instruction to said execution means for control of said arithmetic unit in the transfer and manipulation of data between the operand registers as specified by said source and sink operand designations in said modified instruction and said arithmetic unit.

19. The unit as claimed in claim 18 and further including availability logic for providing indications of the operand registers available for use in connection with execution of instructions, and means for changing said indications in said availability logic as a function of execution of instructions.

20. The unit as claimed in claim 19 and further including a plurality of instruction registers for holding said modified instructions awaiting transfer to said execution means, and interlock logic for controlling the transfer of instructions from said instruction registers to said execution means.

21. The unit as claimed in claim 20 wherein said arithmetic unit includes add and multiply/divide facilities, and said interlock logic includes sourcesink logic for controlling the transfer of instructions to said execution means as a function of the source and sink operand designations in said modified instructions, operand validity logic for controlling the transfer of instructions to said execution means as a function of said tag means, facility available logic for controlling the transfer of instructions to said execution means as a function of the availability of the arithmetic unit facilities, and precedence logic for controlling the transfer of the oldest non-interlocked instruction in said instruction registers to said execution means.

22. The unit as claimed in claim 18 wherein said identification inserting means includes means for storing the identifications of a plurality of said operand registers, means responsive to a first instruction for changing the identity of an operand register stored in said identification inserting means, means responsive to a second instruction for modifying an instruction to insert an operand register identity stored in said identification inserting means and the identity of a second operand register in said second instruction and means responsive to a third instruction for inserting two operand register identities stored in said identification inserting means in said third instruction.

23. The unit as claimed in claim 22 and further including availability logic including means for providing indications of the operand registers available for use in connection with the execution of instructions, and means for changing said availability indications as a function of instruction requests and instruction execution, and wherein the second operand register identification is inserted in said first instruction in response to said operand register availability indications provided by said availability logic and said changing means changes the availability indication of the operand register identified by said second operand register identification in said second instruction in response to a signal from said execution means when said second instruction is in said execution means.

* * * * *